United States Patent [19]
Hettick et al.

[11] 3,792,981
[45] Feb. 19, 1974

[54] CATALYTIC REACTOR

[75] Inventors: George R. Hettick; Donald M. Little; Robert D. Bauer, all of Bartlesville, Okla.

[73] Assignee: Phillips Petroleum Company, Bartlesville, Okla.

[22] Filed: Sept. 15, 1971

[21] Appl. No.: 180,844

Related U.S. Application Data

[62] Division of Ser. No. 853,281, Aug. 27, 1969, abandoned.

[52] U.S. Cl. ......... 23/288 R, 23/288 H, 260/677 H, 260/683 R, 260/701
[51] Int. Cl. ........................... B01j 9/04, C07c 11/04
[58] Field of Search 260/677 A, 677 H, 683 R, 701, 260/681.5; 23/252 R, 288 R, 288 H, 288 K, 288 L, 288 M, 289

[56] References Cited
UNITED STATES PATENTS

| | | | |
|---|---|---|---|
| 2,897,064 | 7/1959 | Foulletier et al. | 23/288 L |
| 2,281,527 | 4/1942 | Simpson et al. | 23/288 L X |
| 2,263,363 | 11/1941 | Menshib | 23/288 M |
| 2,989,383 | 6/1961 | Miller | 23/288 R |
| 2,376,356 | 5/1945 | Harrison | 23/288 R |
| 2,212,583 | 8/1940 | Broderson et al. | 23/288 R |
| 2,899,286 | 8/1959 | Miller | 23/288 R |
| 3,307,921 | 3/1967 | Junginger | 23/288 R |
| 2,143,009 | 1/1939 | Houdry | 23/288 K |

*Primary Examiner*—Joseph Scovronek

[57] ABSTRACT

A plurality of vertically elongated tubular members are disposed within the shell of a catalytic reactor above a grating, and a bed of catalyst is supported by the grating and fills in the volume around the tubular members. Ethylene is purified from small quantities of acetylene by contact with a palladium on alpha alumina catalyst at a critical space velocity range of 5,500 to 6,000.

2 Claims, 3 Drawing Figures

INVENTORS
G. R. HETTICK
D. M. LITTLE
R. D. BAUER
BY Young & Quigg
ATTORNEYS

INVENTORS
G. R. HETTICK
D. M. LITTLE
R. D. BAUER
BY Young & Quigg
ATTORNEYS

CATALYTIC REACTOR

This application is a divisional of application Ser. No. 853,281 filed Aug. 27, 1969, now abandoned.

SUMMARY OF THE INVENTION

In producing ethylene of high purity, especially for polymerization purposes, the amount of acetylene impurity in the product must be very small, of the order of five parts per million by weight or less in the final product. Also, in order to provide an economical operation, ethylene losses in the purification should be 0.3 percent by weight or less.

Heretofore, ethylene containing a small quantity of acetylene has been purified by contacting it with a bed of palladium on alpha alumina catalyst. Typically, the purification is carried out at temperatures of 120° to 220° F. and pressures of 100 to 400 pounds per square inch gage. In operating the unit at a conventional space velocity of about 5,000 volumes per volume per hour and a superficial linear velocity of about 0.43 foot per second, considerable difficulty was encountered in reducing the acetylene content to five parts per million or less and providing ethylene losses of 0.3 percent or less. In fact, ethylene losses ran as high as 1.8 to 4 percent, and the product oftentimes contained 10 parts per million or more acetylene.

We have discovered that the acetylene specification and ethylene loss specification can be reliably met by operating within a critical range of space velocity of 5,500 to 6,000 volumes per volume per hour. In this fashion, ethylene losses of 0.3 percent or less are consistently obtained and the acetylene content of the product is five parts per million by weight or less.

We obtained the foregoing critical ranges of space velocity by utilizing a catalytic reactor of novel design. The reactor has a transverse grating upon which the catalyst bed is supported, and a plurality of vertically elongated tubular members are disposed above the grating, the volume surrounding the tubular members being filled by catalyst.

When utilizing palladium on alpha alumina catalyst for ethylene purification, the tubular members can be advantageously filled with alumina spheres.

It is a feature of the invention that the tubular members can be readily removed and replaced by members of larger or smaller diameter, thereby permitting the space velocity and superficial linear velocity of the reactants to be readily adjusted to an optimum value. Also, we may advantageously provide layers of alumina spheres at the bottom and top of the catalyst bed. Conveniently, two generally similar catalyst beds may be provided in a single catalytic reactor so that the feed successively contacts the two beds proceeding in a downward direction. Advantageously the effluent from the first bed may pass through a cooler before entering the second bed.

The invention resides in the novel catalytic reactor and ethylene purification process which will now be described in more detail with reference to the accompanying drawings, in which.

DETAILED DESCRIPTION OF THE INVENTION

Figure 1:
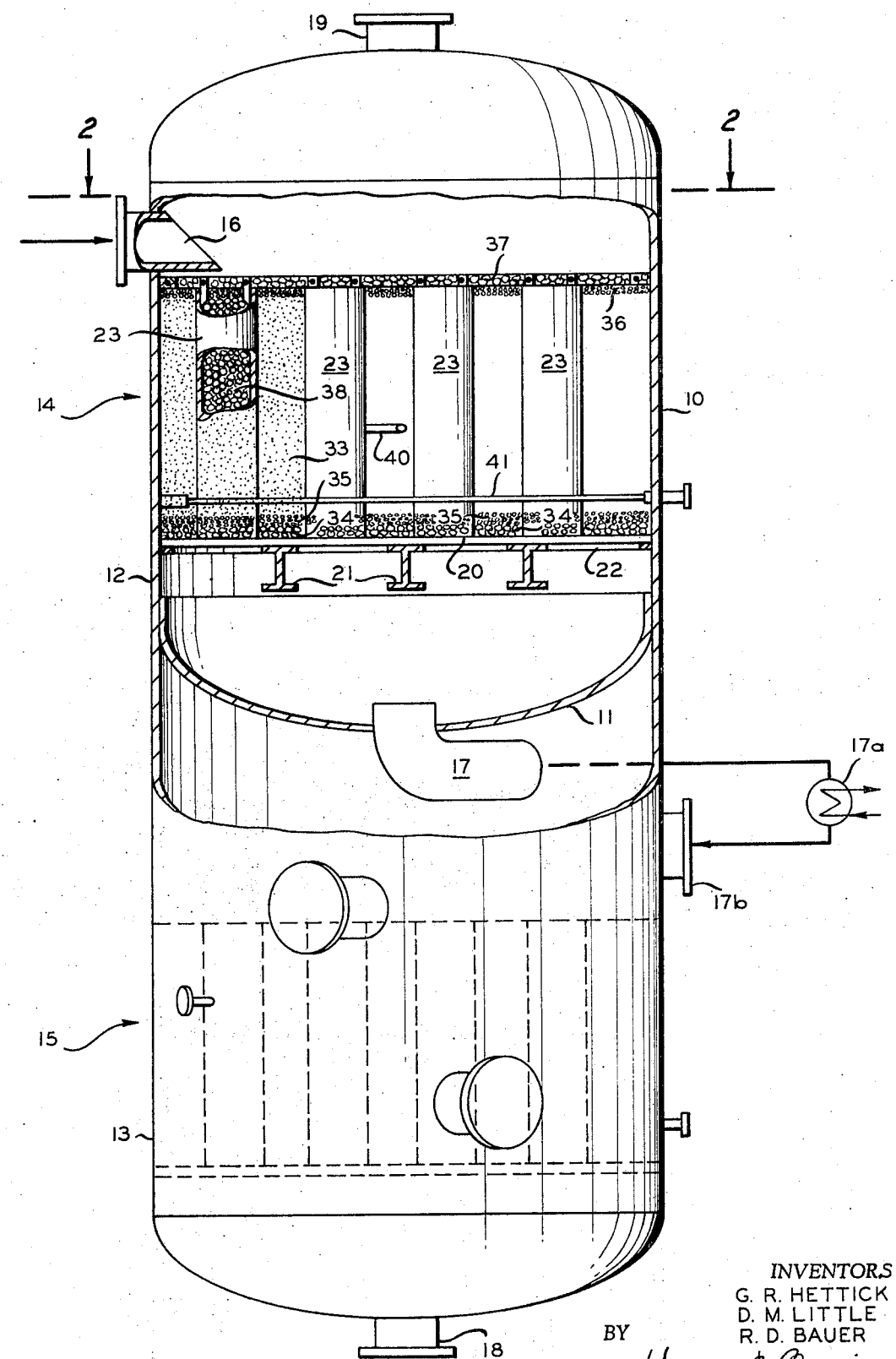
FIG. 1 is a vertical sectional view of a catalytic reactor constructed in accordance with the invention.

Referring now to FIG. 1, our novel catalytic reactor comprises a generally cylindrical upright shell 10 containing an internal baffle 11 which separates it into an upper section 12 and a lower section 13. The upper section 12 contains a catalyst bed generally indicated by reference numeral 14 and the lower section 13 contains a generally similar catalyst bed 15.

The upper section 12 has an inlet 16 above the catalyst bed and an outlet pipe 17 leading to a cooler 17a which is, in turn, connected to an inlet 17b in the lower section 13 which has an outlet pipe 18 at the bottom. Thus, the reactants enter the top of the reactor, flow through the catalyst bed 14, the cooler 17a, the inlet 17b, the catalyst bed 15 and the outlet pipe 18. The top of the reactor is provided with a manhole 19.

The catalyst bed 14 is supported by a grating 20 which, in turn, rests upon three I-beams 21 suitably secured within the reactor. The grating is further supported by a member 22 welded or otherwise suitably secured to the inside of the reactor shell.

Figure 2:
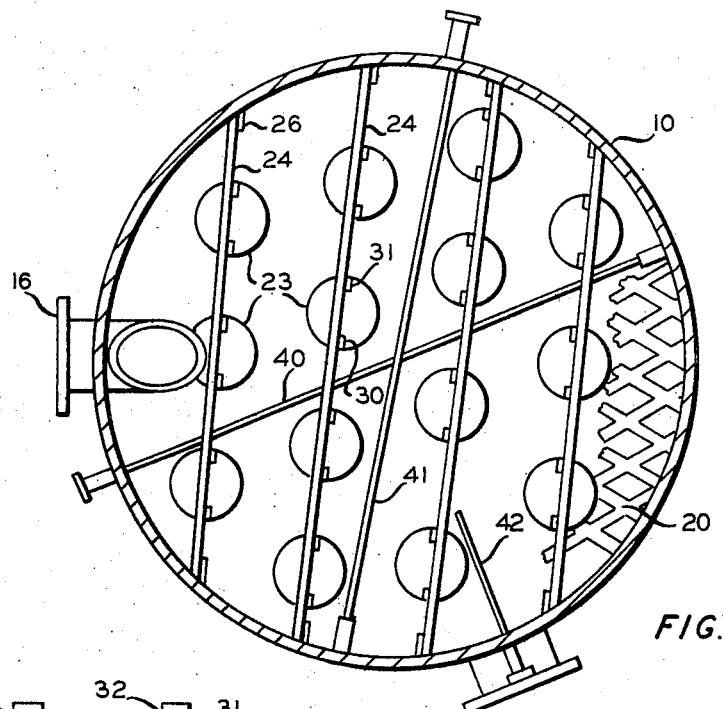
FIG. 2 is a sectional view taken along the lines 2,2 of FIG. 1, looking in the direction of the arrows.

A multiplicity of tubular members 23 are disposed within the shell section 12, there being, in the example shown, four parallel rows, FIG. 2, of which the outer rows contain three tubular elements and the inner rows contain four tubular elements. Each row of tubular members is supported by a bar 24, the ends of which are detachably secured to the reactor shell by fixtures 26 disposed at each end of each rod 24.

Figure 3:
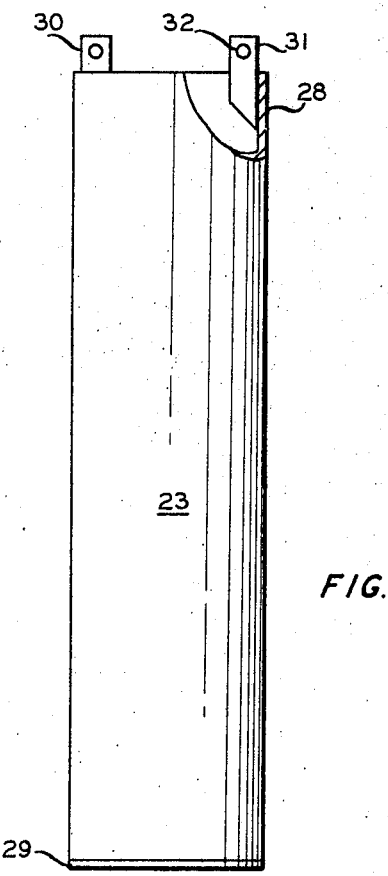
FIG. 3 is a detail view of one of the tubular elements.

As more clearly illustrated in FIG. 3, each tubular member 23 comprises a pipe 28 having a cap 29 welded or otherwise suitably secured to the bottom thereof. The pipe 28 has two upstanding ears 30, 31 at the top thereof which are drilled as indicated at 32, to permit them to be bolted to the rods 24, FIG. 2.

Generally speaking, the volume around the tubular members 23 is occupied by a bed 33 of catalyst. Preferably and advantageously, however, there is a layer 34 of alumina spheres at the bottom of the bed in contact with the grating 20 and a layer 35 of smaller spheres above the layer 34, the catalyst bed contacting the upper part of the layer 35. Where the catalyst, for example, consists of ⅛ inch pellets, the layer 35 may consist of ¼ inch alumina spheres, and the layer 34 of half-inch alumina spheres. At the top of the catalyst bed is a layer 36 of alumina spheres overlaid by a layer 37 of larger alumina spheres. In the example described, the spheres in the layer 36 are of ½ inch diameter and the spheres in the layer 37 are of 1 inch diameter.

Preferably and advantageously, the tubular members 23 are filled with alumina spheres which, in the example described, may be of 1 inch diameter. In loading the reactor with catalyst, the layers of spheres 34, 35 are inserted, and the tubular elements are filled almost to the top with spheres 38. Thereupon, the tops of the tubular members are covered while the catalyst is being loaded into the volume around the tubular members. Thereupon, the covers are removed and the layers 36, 37 of spheres are placed on top of the catalyst bed.

The lower catalyst bed 15 is, in the example shown, similar in all respects to the upper catalyst bed 14 except that the volume of the upper bed is slightly greater. In one specific example, the volume of the upper bed was 362 cubic feet, and the volume of the lower bed was 334 cubic feet.

Both reactor sections are provided with thermocouple tubes 40, 41 and 42, FIG. 2, so that the temperature may be measured at various positions within the catalyst bed.

It will be apparent that we have achieved the objects of our invention in providing a catalytic reactor wherein the space velocity and superficial linear velocity are increased. Moreover, by virtue of the novel tubular elements 23, the effective volume of the bed can be readily varied. For example, any desired tubular element can be readily detached from the rod 24, FIG. 2, and replaced by a tubular element of larger or smaller diameter, or even removed altogether. Also, by detaching one or more of the rods 24, a whole set of tubular elements can be removed and replaced by larger or smaller elements as desired to obtain optimum conditions of operation.

Our novel reactor has been successfully utilized in the commercial purification of ethylene containing small quantities of acetylene, of the order of 800 to 2,000 parts per million by weight. To this end, the catalyst beds 14 and 15 consisted of ⅛ inch pellets of palladium supported on alpha alumina. The specific catalyst utilized contained 0.05 percent by weight of palladium. The reaction was carried out at a temperature of 135° F. and a pressure of 365 pounds per square inch gage. While the temperature and pressure form no part of the present invention, commercial operations have been conducted at temperatures of 120° to 220° F. and 100 to 400 pounds per square inch gage.

When operating at a space velocity of about 5,000 volumes per volume per hour, the amount of acetylene in the product exceeded five parts per million by a considerable degree for extended periods of operation. Ethylene losses were as high as six to 13 times the 0.3 percent design expectation. Various operating changes were made to alleviate the situation, both with the original charge of catalyst and a fresh charge of catalyst, but the acetylene content was still excessive and the ethylene loss too high.

Thereupon, the tubular elements 23 were inserted into the catalyst beds, and the space velocity thereby increased to a critical value of 5,500 to 6,000 volumes per volume per hour. Thereafter, the unit consistently produced high purity ethylene containing five parts per million or less by weight of acetylene, and losses of ethylene feed were consistently 0.3 percent or less.

Other variations and modifications of this invention will be apparent to those skilled in the art without departing from the spirit and scope of the invention.

We claim:

1. A catalytic reactor comprising, in combination, a reactor shell, a transverse grating in said shell, a plurality of vertically elongated, removable tubular members disposed within said shell above said grating, a plate closing off the bottom of each tubular member, a body of alumina particles substantially filling each of said tubular members, a layer of relatively large alumina spheres carried by said grating, a layer of relatively small spheres overlaying said relatively large layer, a bed of catalyst supported by said layer of said relatively small alumina spheres and filling in the volume around said tubular members, a layer of relatively small alumina spheres carried at the top of said catalyst bed, a layer of alumina spheres of relatively large diameter carried by said last-mentioned layer and overlaying the catalyst bed and said tubular members, a feed inlet at one end of said reactor, and an outlet for converted material in the end of said other reactor.

2. The catalytic reactor of claim 1 wherein said shell has a transverse baffle below said catalyst bed, thereby defining a lower section in the reactor shell, a second set of tubular members supported within a catalyst bed in said lower section, said second set of tubular members being similar to said first set of tubular members, a cooler, and means for passing fluid to be converted through one catalyst bed, the cooler and the other catalyst bed.

* * * * *